Dec. 10, 1929.  A. J. BOYNTON  1,738,939
POWER DRIVEN BIN GATE ACTUATING DEVICE
Filed May 19, 1927  3 Sheets-Sheet 3
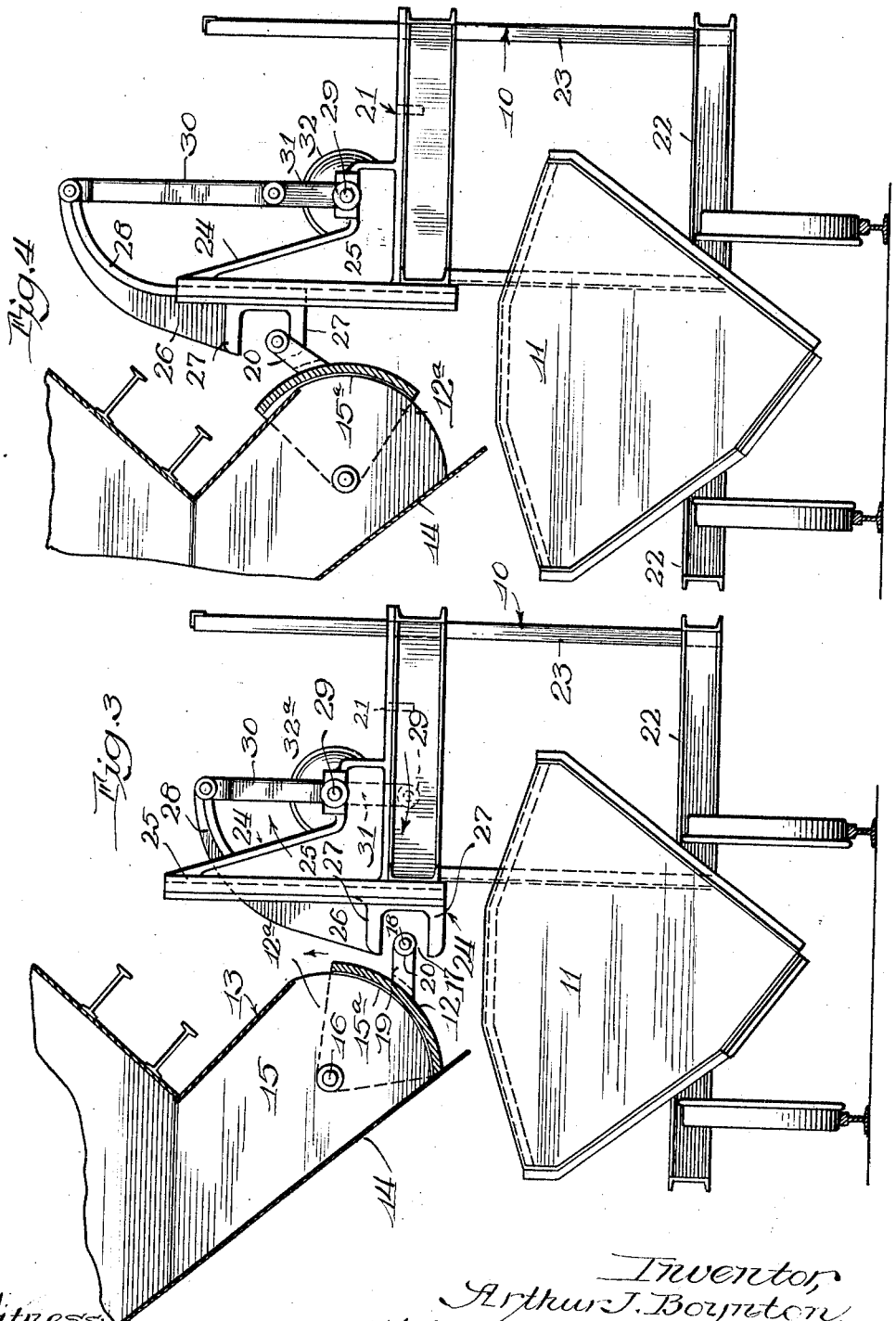

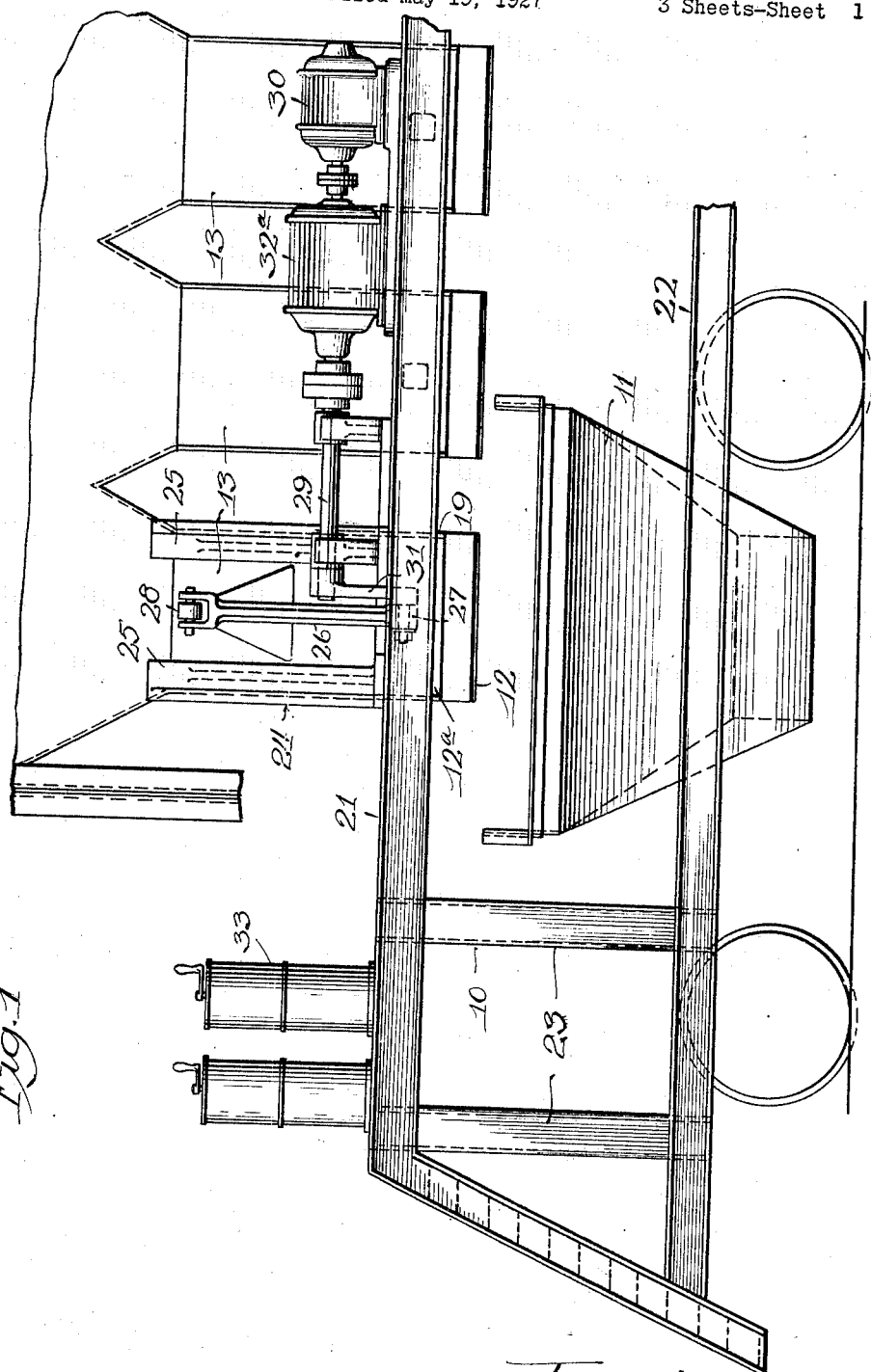

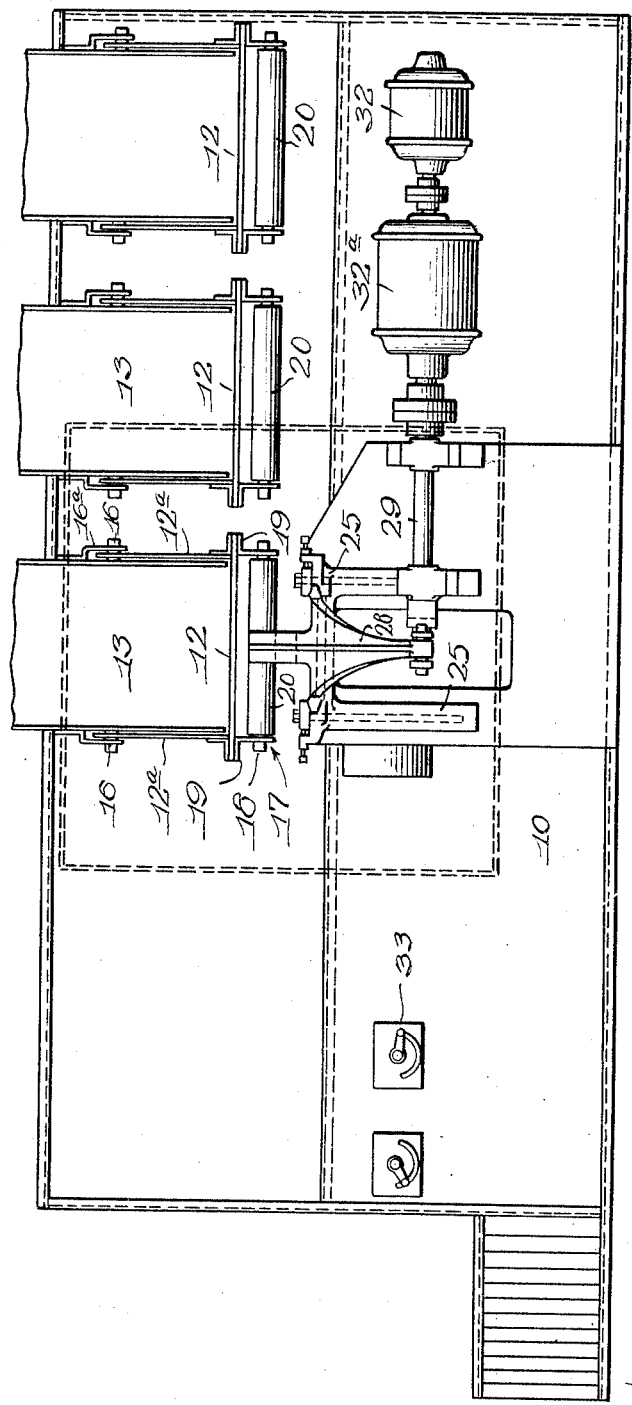

Patented Dec. 10, 1929

1,738,939

UNITED STATES PATENT OFFICE

ARTHUR J. BOYNTON, OF WINNETKA, ILLINOIS, ASSIGNOR TO H. A. BRASSERT & COMPANY, OF CHICAGO, ILLINOIS, A CORPORATION OF ILLINOIS

POWER-DRIVEN BIN-GATE-ACTUATING DEVICE

Application filed May 19, 1927. Serial No. 192,771.

This invention relates to a power driven bin gate actuating device and consists of the matters hereinafter described and more particularly pointed out in the appended claims.

In blast furnace and similar plants, large quantities of bulk material are stored in bins provided with a plurality of laterally spaced discharge openings each closed by a pivotally mounted gate. The stored material is removed from these bins by scale cars on which the material is accurately weighed and the accuracy of the weighing depends upon the attention given to it by the operator. As the opening of the bin gates is a heavy task and as they have to be opened a number of times during the day, it is desirable to have the scale car equipped with power actuated means for opening said gates.

The object of the present invention is to provide a simple, efficient, and economical power driven bin gate opening device which is adapted to be operated to open a bin gate whenever the scale car is brought to proper position to receive the discharge of the material through the gateway or passage closed by said gate.

In the drawings:—

Figure 1 is a side elevation of a scale car provided with my improved bin gate opening device.

Figure 2 is a top plan view of the same showing the car in position to receive the discharge through the passage closed by one of the bin gates.

Figure 3 is an end elevation showing the bin gate opening mechanism in position ready to open the bin gate.

Figure 4 is a like view showing the position of the parts after the bin gate opening mechanism has been actuated.

Referring now to that embodiment of the invention illustrated in the drawings:—10 indicates a scale car of familiar construction having a hopper 11 which, as illustrated in the drawings, is in position opposite one of a plurality of laterally spaced bin gates 12, closing the bin discharge chutes 13. Each discharge chute is defined by the bin floor 14, inclined downwardly at a sharp angle to permit the ready discharge of the contents of the bin into the hopper of the scale car, and by vertical side walls 15, 15. The bin gate is of the so-called upper-cut type,—that is to say, it closes down on top of the bin floor 14, as shown in Figure 3. The bin gate is circular in vertical section and has laterally spaced side members or arms 12$^a$, 12$^a$ (see Figures 2 and 3) which embrace the side walls 15, 15 of the chute 13. The said side walls have curved ends 15$^a$, 15$^a$ concentric with the curvature of and closing against the gate 12 and the gate arms 12$^a$ are pivoted on studs 16 carried at the common center by bracket plates 16$^a$, 16$^a$ fixed to the side walls 15, 15 of the chute. The gate is opened by swinging it upwardly on the studs 16 away from the bin floor 14.

On each gate is fixed a device 17 to be engaged to raise or lower the gate. This device consists of a horizontal rod 18 extending transversely in front of the gate and supported in angle bars 19 attached to the lateral margins of said gate. By preference, a bushing 20 is mounted on rod 18 for anti-friction purposes when engaged by the power driven lifting device now to be described.

21 indicates an elevated platform, extending longitudinally of the scale car and supported on the frame 22 thereof by uprights 23, 23 somewhat to one side of the median line of the hopper 11. On the platform 21 at the side above the hoppers is rigidly mounted an upright frame 24 including two vertically grooved, laterally spaced guide members 25, 25 for a vertically reciprocable jaw member 26. The jaws of said member consist of vertically spaced, horizontal projecting lugs 27, 27 so placed that when the car 10 is brought to position to receive the discharge from a bin door 12, said jaws will be above and below the rod 18 with its bushing 20 in readiness to engage the device 17 and, by vertical movement, swing the gate 12 upwardly on the studs 16. Preferably and as shown, the guide members 25 are spaced apart a distance approximately equal to the width of the gate 12 (see Figure 2) and the jaws 27 of the jaw member 26 are located midway between said guide members.

The jaw member 26 includes a centrally disposed arm 28 which is curved upwardly and away from the vertical plane of the guide members 25 and from the position of the bin gates to be operated. 29 indicates a shaft extending longitudinally of the car and mounted in suitable bearings on the platform 21. A pitman or connecting rod 30 and a crank 31 connect the said arm 28 with the shaft 29. The throw of the crank 31 is such as to raise the arm 28 and the jaw member 26 a distance sufficient to raise the bin gate 12 from closed position to fully opened position.

The shaft 29 is operated by an electric motor 32 to which it is operatively connected by a suitable gear reduction set 32ª. The motor is in circuit with a reversible motor control 33 to which it is connected by electric conductors not necessary to be shown. The electric connections and motor are such that the motor may be reversed by the controller 33 to drive the shaft 39 in either direction.

The operation of the device is as follows. After the car has been brought to proper position to receive the discharge from a chute 13 of the bin, the motor 32 is started by means of the controller 33. The shaft 29 is rotated and the crank arm 31 is caused to swing in the direction indicated by the arrow in Figure 3. By reason of the connection with the connecting rod 30, the jaw member 26 is caused to rise and in its rising movement to engage the member 17 on the bin gate and swing said gate upwardly to open it. A movement of the crank arm to 180 degrees fully opens the gate. Manifestly, the gate may be closed either by the rotation of the shaft in the same direction that it was rotated to raise the gate or by a reversal of that direction of rotation. A reversal of the direction of rotation of the shaft, however, is desirable since it permits a partial opening of the bin gate 12 and also permits a vibratory up and down movement to be given to the gate by rapid reversals of the motor 32 effected by the controller 33 when necessary.

After the gate has been closed, the car is ready to proceed to another bin, the jaws 27 of the jaw member 26 passing beyond the device on the gate which has been operated.

While in describing my invention I have referred to several details of mechanical construction and arrangement of parts, it will be understood that the invention is in no way limited thereto except as may be pointed out in the appended claims.

I claim as my invention:

1. In combination, a bin provided with a discharge chute having a downwardly inclined floor, a vertically swinging gate closing against said floor, a catch device rigid with said gate and extending horizontally therefrom, a scale car, a hopper carried thereon, a reversible, longitudinally extending shaft mounted on said scale car above said hopper on the side remote from said gate, a motor capable of driving said shaft in either direction, a reciprocable jaw member having vertically spaced jaws adapted to engage said catch device, a vertical guide frame for said jaw member rigidly mounted on said car in close proximity to said gate, an arm fixed to said jaw member, said arm being curved upwardly and rearwardly to a point substantially above said shaft, a crank on said shaft having a throw equal to the vertical movement of said bin gate, and means operatively connecting said crank and said arm.

2. In combination, a bin provided with a discharge chute having a downwardly inclined floor, a vertically swinging gate closing against said floor, a catch device rigid with said gate and extending horizontally therefrom, a scale car, a hopper carried thereon, a reversible, longitudinally extending shaft mounted on said scale car above said hopper on the side remote from said gate, a motor capable of driving said shaft in either direction, a gear reduction set connecting said motor and shaft, a reciprocable jaw member having vertically spaced jaws adapted to engage said catch device, a vertical guide frame for said jaw member rigidly mounted on said car in close proximity to said gate, an arm fixed to said jaw member, said arm being curved upwardly and rearwardly to a point substantially above said shaft, a crank on said shaft and a pitman connecting said crank and said arm.

In testimony that I claim the foregoing as my invention, I affix my signature this 13th day of May, A. D. 1927.

ARTHUR J. BOYNTON.